Jan. 12, 1954   J. D. RUST   2,665,534
ADJUSTABLE COTTON PLANT GUIDE
Filed Dec. 10, 1952

INVENTOR.
JOHN D. RUST
BY
Estabrook & Estabrook
ATTORNEYS

Patented Jan. 12, 1954

2,665,534

UNITED STATES PATENT OFFICE 2,665,534

ADJUSTABLE COTTON PLANT GUIDE

John D. Rust, Pine Bluff, Ark.

Application December 10, 1952, Serial No. 325,089

6 Claims. (Cl. 56—36)

This invention relates broadly to cotton picking machines and more specifically to an adjustable attachment for guiding the cotton plants into engagement with a rotary fluffing device.

The present application constitutes an improvement of certain of the features shown in my co-pending application Serial No. 219,145, filed April 4, 1951, now Patent 2,657,514.

In cotton fields that are relatively free from weeds, vines, grasses and the like and the lint of the open cotton bolls is in a fluffy state or condition the rotating spindles of a cotton picking machine readily engage the lint for winding the cotton thereon, thus thoroughly picking the open cotton from the stalk. Such a condition, however, does not always exist in a field of open cotton, due to boll weevil infestation, "honeydew," or other adverse conditions. Under such circumstances the lint of the cotton is not fluffy and therefore not readily engaged by the spindles.

In certain of my previous designs I have employed a rotary cotton fluffing device in conjunction with stationary guiding elements that have proven to be quite effective in engaging the open cotton bolls for fluffing the lint of the open cotton. However, in said previous designs, the stationary guiding elements, which are mounted on the stalk guards, were so positioned with respect to the rotary fluffing device as to define a relatively narrow and restricted passage for the cotton plants. Thus under certain conditions, such as fields of green cotton plants, this fixed position of the stationary guiding elements to define a relatively narrow and restricted passage in conjunction with the rotary fluffing device, was such that the green cotton plants and the green bolls thereon would be damaged to some extent in passing through such a passage. Therefore, when such conditions were encountered, with cotton picking units embodying my previous designs, it was often necessary to remove the stationary guiding elements so as to provide a passage of such a size that the green cotton plants could pass therethrough without being damaged.

The removal of the stationary guiding elements is not only a time consuming operation but also a laborious one. Furthermore it was often found that the condition of the cotton plants in adjacent fields was such that it was necessary to remove the stationary guiding elements in order to pick the cotton in one field while the next field required the use of said stationary guiding elements in order to effectively and efficiently pick the cotton.

The present invention is designed to overcome such conditions and is readily adaptable for use in any type of cotton field.

The primary object of the present invention is to provide for use with a cotton picking unit a rotary cotton fluffer and an adjustable plant guiding device cooperating therewith for guiding and directing the plants into engagement with the fluffer.

Another object is to provide for use with a cotton picking unit a rotary cotton fluffer and a plant guiding device wherein the latter device is adjustable with respect to the rotary fluffer for increasing or decreasing the width of the passageway between said device and fluffer through which the cotton plants pass.

Another object is to provide for use with a cotton picking unit having a picking plant passageway with a plant guiding device mounted therein which includes a plurality of members rigidly mounted in spaced relation on an adjustable vertical support for moving the guiding device into or out of operative position in said passageway.

A further object is to provide for use with a cotton picking unit a rotary cotton fluffer and an adjustable plant guiding device wherein the latter device may be provided with serrated finger members for aiding in the fluffing of the cotton during the guiding of the cotton plants into engagement with the rotary fluffer.

Further objects of the present invention are to provide for use with a cotton picking machine an adjustable plant guiding device that is readily and easily removed from or mounted in the picking unit of the cotton picking machine, which is economical of manufacture and wherein the elements or members of the guiding device are capable of being replaced with a minimum of effort and time.

Other objects and advantages more or less ancillary to the foregoing and the manner in which all of the various objects are realized will appear in the following description which, considered in connection with the accompanying drawing, sets forth the preferred embodiment of the invention.

Referring to the drawing wherein the preferred embodiment of the invention is illustrated:

Figures 1, 2, 3, 4:
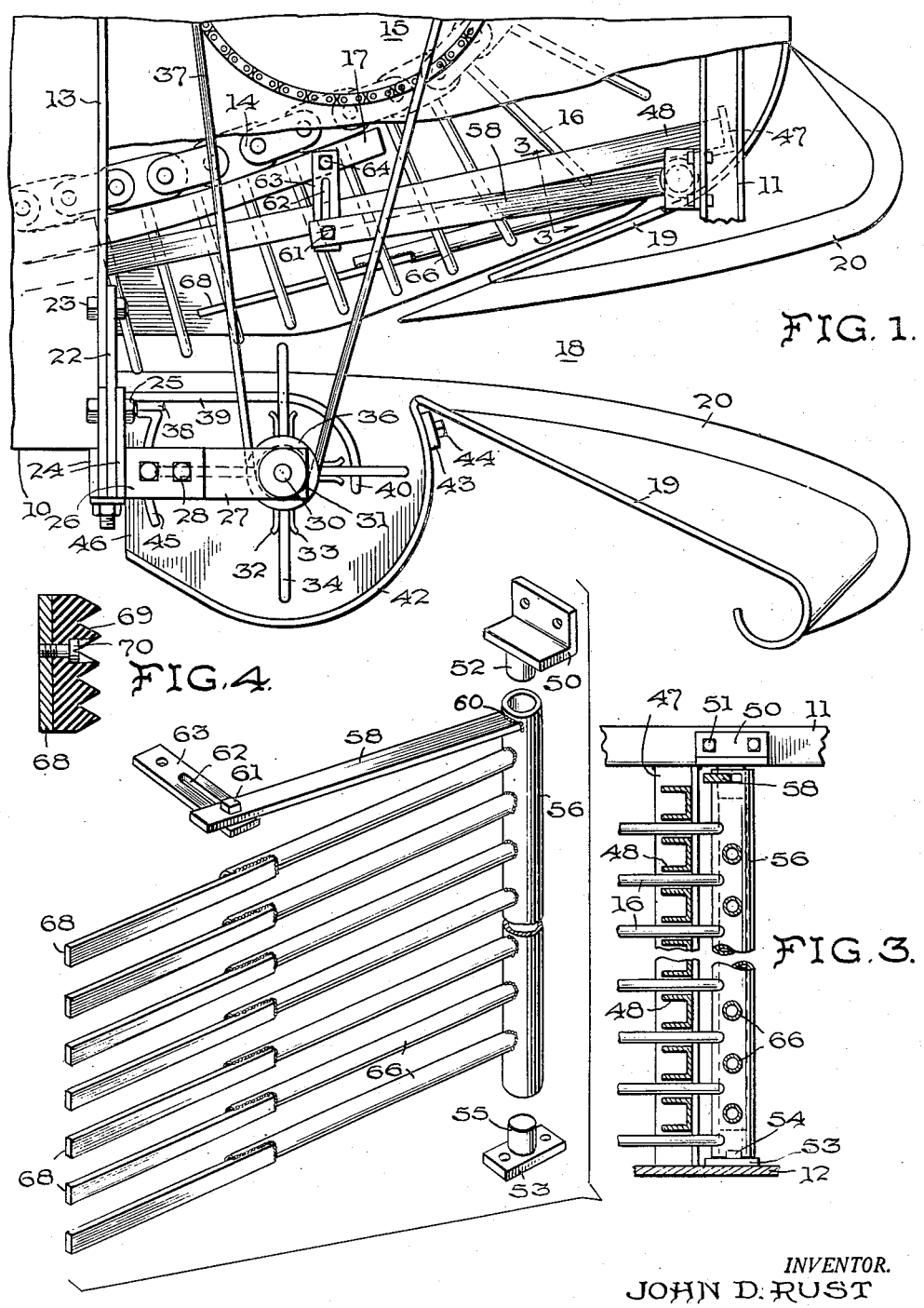
Figure 1 is a fragmentary top plan view of the front or forward end portion of a cotton picking unit with the cover removed and showing a rotary cotton fluffing device and the adjustable plant guiding device of the present invention.
Figure 2 is an enlarged perspective view with parts broken away of the adjustable plant guiding device of the present invention.
Figure 3 is a vertical sectional view showing the plant guiding device and its relation with the picking spindles and stalk guards.
Figure 4 is an end view with parts broken away and shown in section of a modified form of the guide fingers of the plant guiding device shown in Figure 2.

Referring to the drawings, there is shown in Figure 1 a portion of the forward end of a cotton picking unit having a side frame member 10, top and bottom end frame members 11 and 12 and a transverse intermediate frame bracing member 13. The picking unit carrying structure and the spindle carrying slats are not illustrated as they do not constitute a part of the present invention, however, these parts of the picking unit may be of the same general type as shown in Rust Patents 2,085,046; 2,175,216; 2,502,063; 2,548,069 and others.

A sprocket chain 14 entrained about a suitable sprocket 15 carries spindle slats, not shown, which have spindles 16 journaled therein. The intermediate frame bracing member 13 has secured thereto a guide rail 17 which is employed for guiding and supporting the sprocket chain 14. A picking plant passageway 18 extends from the forward end to a point adjacent the rear end of the cotton picking unit so that the spindles 16 which project into the passageway are capable of engaging the fluffy lint of the open cotton bolls as the plants pass through the passageway during the travel of the cotton picking machine along a row of plants. The forward or entrance end portion of the passageway 18 is defined by curved elements 19, which together with boll lifting elements 20 engage and direct the cotton plants into the picking mechanism as the cotton picking machine moves along a row of plants.

The intermediate frame member 13 has a vertically extending plate 22 secured thereto by bolts 23 which plate has a pair of arms 24 mounted on opposite sides thereof by nut and bolt 25. One of the arms 24 has an outwardly projecting bracket 26 affixed thereon to which a plate member 27 is secured by nuts and bolts 28. The plate member 27 has affixed thereto a depending shaft 30 upon which is mounted for rotation with respect thereto a sleeve or member 31. The sleeve 31 has mounted thereon, at diametrically opposite points and throughout its length, brackets 32 and 33 which have a plurality of vertically spaced flexible members or flaps 34 clamped therebetween. The upper end of the sleeve or member 31 is provided with a pulley 36 around which is entrained a belt 37 that is also entrained about another pulley, not shown, which is rotatably driven by the shaft upon which sprocket 15 is mounted.

The frame member 13 has a depending frame support 38 mounted thereon, which support has fixed thereon in vertically spaced relation a plurality of guide fingers or members 39. The fingers 39 project along one side and towards the entrance of the plant passageway 18 with the free ends 40 of said fingers being curved and arranged to extend around the rotary member 31 but in spaced relation therewith. The guide fingers or members 39 are so spaced on the vertical supporting member 38 as to permit the flexible members or flaps 34 to pass therebetween. That is, a guide finger or member 39 is adapted to extend between the spaced adjacent flexible flaps 34 mounted within the brackets 32 and 33 on the rotating sleeve 31. The flexible members or flaps 34 are of sufficient length so that in their path of rotation they will extend into the plant passageway 18 to engage and fluff the lint of the open cotton bolls as the cotton picking machine moves along a row of plants. A housing 42 encloses the rotating member 31 and flexible flaps 34 with the forward portion of the housing being secured to a vertical support 43 by a nut and bolt 44. The vertical support 43 is affixed to the forward portion of the picking unit frame, not shown. The rear end portion of the housing 42 is open and an arcuate shaped baffle plate 45 secured to the vertical support 38 extends into the housing, but is spaced therefrom to provide an air inlet passage 46.

The end frame members 11 and 12 have secured thereto a vertically extending support or frame member 47, Figure 3, preferably of angular configuration. The frame member 47 has secured thereto in vertically spaced relation a plurality of stalk guards 48 which extend along the inner side of the plant passageway 18. The end frame member 11 has an angular shaped plate member 50 secured thereto by suitable nuts and bolts 51. The plate member 50 is provided with a depending lug or projection 52, Figure 2. The end frame member 12 has a plate member 53 affixed thereto by suitable nuts and bolts 54. The plate member 53 is provided with an upwardly extending lug or projection 55, Figure 2, which is disposed in aligned relation with the projection 52 of the plate 50 that is mounted on the end frame member 11. A tubular sleeve or member 56 is interposed between the plate members 50 and 53 and is supported on the pins 52 and 55 for rotative movement with respect thereto.

As shown in Figure 2 the tubular member 56 has adjacent its upper end an outwardly extending arm or lever 58 which has one end welded as at 60 to the tubular sleeve 56. The lever 58 is disposed in a plane normal to the longitudinal axis of the sleeve 56 and is provided at its outer end with a bolt 61 which projects through a slot 62 provided in a plate 63 that is affixed to the guide rail 17 by a nut and bolt 64. The bolt 61 in the end of the lever 58 is provided with a nut for securing the bolt within the slot 62 and thus anchor the lever to the plate. Thus the tubular sleeve 56 may be rotated upon the pins 52 and 55 through movement of the lever 58 and may be secured in various positions by means of the slot 62 provided in the plate 63 through which the bolt 61 extends. A plurality of vertically spaced arms 66 have an end secured to the tubular sleeve 56 and extend in a plane normal to the longitudinal axis of the sleeve. The arms 66 may have secured to their outer ends, by any suitable means, guide fingers or members 68 which are adapted to engage and guide the cotton plants into the path of rotation of the flexible members or flaps 34. While the arms 66 may be of any suitable shape or design it has been found from experience that the use of arms of a tubular or cylindrical configuration has proven very satisfactory. Furthermore in lieu of the guide fingers or members 68 being secured to the arms 66 said arms may be so formed as to terminate in guide members.

As shown in Figure 4 the fingers or members 68 which guide the cotton plants in the path of rotation of the flexible members 34 may have affixed thereto serrated rubber facing members 69 which will aid in fluffing the lint of the open cotton bolls while at the same time guiding the cotton plants into engagement with the flexible members 34. Thus when the fingers 68 are provided with serrated facing members 69 said serrated facing members will tend to fluff the lint of the open cotton bolls disposed on the side of the plants adjacent the inner side of the plant passageway and which might not be engaged by the flexible members 34.

In the operation of the present invention the cotton plants are directed into the passageway 18 as the cotton picking machine moves along a row of cotton plants. As the cotton picking machine moves along the row of cotton plants the spindles 16 carried by sprocket chain 14 are rotated as they move into the plant passageway and the sleeve 31 with the flexible flaps 34 thereon is rotatably driven by the belt 37. As the cotton plants enter the plant passageway 18 the guide fingers 39 and the members 68 carried on the ends of the arms 66 engage the plants and guide them into the path of rotation of the flexible members 34, which members strike the open cotton bolls and thus fluff the lint so that it is in the best condition for being engaged and wrapped around the rotating spindles 16.

If the condition of the cotton plants is such that they might be damaged in passing through the restricted space in the plant passageway defined by the guide fingers 39 and the fingers 68, mounted on the ends of the arms 66, the outer end of the lever 58 may be adjusted on the plate 63 by means of the bolt 61 which projects through the slot 62 in the plate 63. That is, the lever 58 may be moved inwardly towards the guide rail 17, which movement would cause the tubular sleeve 56 to rotate on the pins 52 and 55 thereby moving the arms 66 and the fingers 68 inwardly towards the stalk guards 48 increasing the space between the guide fingers 39 and the fingers 68. This arrangement allows the cotton plants to pass through the passageway without being crowded between the fingers 39 and 68. In fact the fingers 68 may through the movement of the lever 58 be moved away from the guide fingers 39 into abutting engagement with the stalk guards 48 so that the cotton plants would pass through the plant passageway 18 as freely as though the fingers 68 had been removed.

Under field conditions wherein the lint of the open cotton bolls is in a fluffy state the use of the rotary fluffer and the adjustable plant guiding device might not be necessary. Thus the belt 37 could be disconnected from the pulley 36 and the bolt 61 on the lever 58 could be moved inwardly in the slot 62 of the plate 63 whereby the finger members 68 would move into abutting engagement with the stalk guards 48. With the plant guiding device so positioned and with the belt 37 removed from the pulley 36 of the rotary fluffer the cotton plants would pass through the passageway 18 in a manner as though the fluffing device and guiding device had been removed from the cotton picking unit.

Thus it is apparent that the rotary fluffing device and the plant guiding device may be adjusted so as to be substantially inoperative or the fluffing device may be rotated and the guiding device arranged in various positions in the passageway 18 between the stalk guards 48 and the rotary fluffing device depending upon the conditions of the cotton.

The adjustable plant guiding device may have mounted on the ends of the arms 66 finger members 68 having serrated rubber shoe members 69 secured thereto by screws 70. In the use of the serrated rubber finger members 69 the cotton plants entering the passageway 18 will be guided into the path of rotation of the flaps 34 in the same manner as when the fingers 68 are employed. However, the serrated finger members 69 will, in guiding the cotton plants into engagement with the flaps 34, be drawn or dragged across certain of the open cotton bolls that are disposed on the side of the plants adjacent the inner side of the plant passageway. Thus the members 69 not only guide the plants into engagement with the rotary fluffing device but also tend to fluff the lint of certain of the open cotton bolls on the cotton plants.

I claim:

1. A cotton plant guiding device for use with a cotton picking unit having a plurality of rotatably driven cotton picking spindles, said device including an adjustable support adapted to be mounted on said unit, a plurality of arms secured to said support in vertically spaced relation and in a plane normal to said support, a member having a serrated surface affixed to an end of each of said arms and a lever secured to said support for adjusting same and moving said members into position for guiding the cotton plants, the serrated surfaces of said members engaging the cotton plants to fluff the cotton.

2. A cotton plant guiding device for use with a cotton picking unit having a plurality of rotatably driven cotton picking spindles, said device including an adjustable support adapted to be mounted on said unit, a plurality of arms secured to said support in vertically spaced relation and projecting therefrom in a common plane, a guide member affixed to an end of each of said arms, a lever having an end affixed to said support, a plate adjustably secured to the other end of said lever and adapted to be mounted on said unit to vary the position of said guide members for engaging and guiding the cotton plants.

3. A cotton plant guiding device comprising an adjustable support, a plurality of arms secured to said support in vertically spaced relation and projecting therefrom in a common plane, guide members affixed to said arms and serrated rubber facing members secured to said guide members.

4. A cotton plant guiding device for a cotton picking unit, said device including an adjustable support, a plurality of guide members secured to said support in vertically spaced relation and projecting therefrom in a common plane and means secured to said support for moving said guide members into and out of engagement with the cotton plants.

5. A cotton plant guiding device for a cotton picking unit having a plant passageway and picking spindles for engaging the cotton plants in said passageway and a rotatable fluffing member positioned near the entrance of the passageway, said device including an adjustable support adapted to be mounted on said unit opposite the rotatable fluffing member, a plurality of superposed arms secured to said support in spaced relation with one another, guide members secured to said arms and means secured to said support for moving said guide members to engage and guide the cotton plants.

6. A cotton plant guiding device for a cotton picking unit having a plant passageway and picking spindles for engaging the cotton plants in said passageway and a rotatable fluffing member positioned near the entrance of the passageway, said device including an adjustable support adapted to be mounted on said unit opposite the rotatable fluffing member, a plurality of arms secured to said support in vertically spaced relation and in a plane normal to said support, a guide member affixed to an end of each of said arms, a serrated rubber facing member affixed to said guide members, a lever having an end affixed to said support, a plate adjustably secured to the other end of said lever and adapted to be mounted on said unit to vary the position of said serrated rubber facing members for engaging the cotton plants whereby the cotton plants will be directed into engagement with the rotatable fluffing member.

JOHN D. RUST.

References Cited in the file of this patent

UNITED STATES PATENTS

| Number | Name | Date |
|---|---|---|
| 1,786,851 | Johnston et al. | Dec. 30, 1930 |
| 2,025,514 | Johnston | Dec. 24, 1935 |
| 2,058,514 | Rust et al. | Oct. 27, 1936 |
| 2,140,631 | Johnston | Dec. 20, 1938 |
| 2,200,464 | Berry | May 14, 1940 |